C. V. HERVERT.
NUT LOCK.
APPLICATION FILED FEB. 24, 1914.
1,195,468.
Patented Aug. 22, 1916.
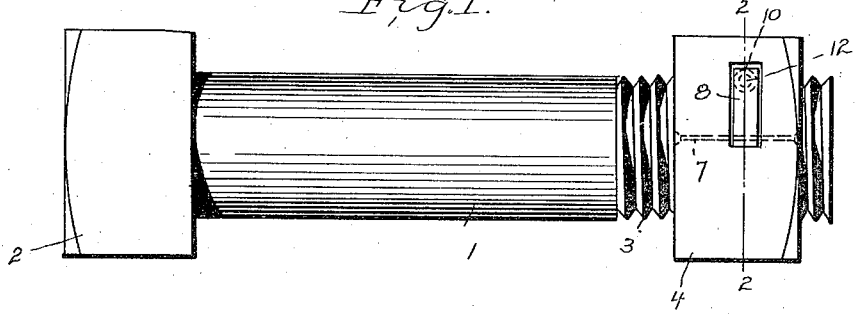
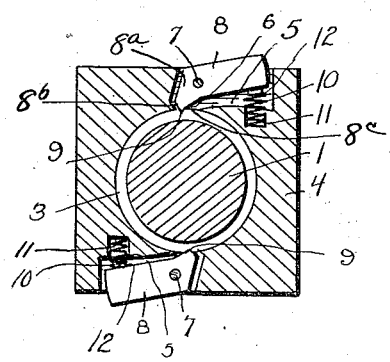
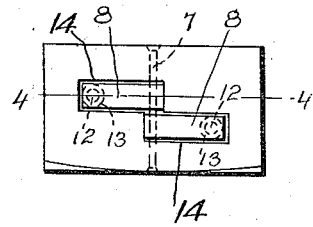
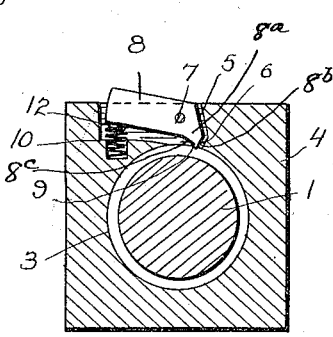
Witnesses
Inventor
C. V. Hervert
By
Attorney

UNITED STATES PATENT OFFICE.

CHARLES V. HERVERT, OF RAVENNA, NEBRASKA.

NUT-LOCK.

1,195,468.      Specification of Letters Patent.     Patented Aug. 22, 1916.

Application filed February 24, 1914. Serial No. 820,599.

*To all whom it may concern:*

Be it known that I, CHARLES V. HERVERT, a citizen of the United States, residing at Ravenna, in the county of Buffalo and State of Nebraska, have invented certain new and useful Improvements in Nut-Locks; and I do hereby declare the following to be a full, clear, and exact description of the invention, such as will enable others skilled in the art to which it appertains to make and use the same.

This invention relates to nut locks and one of the principal objects of the invention is to provide a nut lock which will hold a nut in any desired position upon the threads of a bolt, and which can be quickly adjusted by applying a wrench to the nut, and which will lock the nut upon the bolt when the wrench is removed.

Another object of the invention is to provide a nut lock which will hold the nut against moving in either direction on or off the bolt, and which can be quickly adjusted by the application of a wrench, and which can be used for either a right or left screw threaded bolt.

These and other objects may be attained by means of the construction illustrated in the accompanying drawing, in which, Figure 1 is a side elevation of a bolt having a nut thereon provided with a nut lock, made in accordance with this invention, Fig. 2 is a sectional view taken on the line 2—2 of Fig. 1, Fig. 3 is a top plan view of a nut provided with a double nut lock, made in accordance with this invention, Fig. 4 is a sectional view taken on the line 4—4 Fig. 3.

Referring to the drawing, the numeral 1 designates a bolt which may be of the usual or any suitable type or construction, and as shown is provided with a head 2 and screw threads 3 of the usual type.

The nut 4 is provided with a recess 5 on one face thereof, said recess having a slot 6 which communicates with the interior threaded bore of the nut. A locking element is mounted in the recess 5, and it comprises an oblong body 8 pivoted within the recess by a pin 7 which passes through the body at a point adjacent one end thereof. A pawl 8$^a$ is located at and extends inwardly and forwardly from the short end of the body 8, and it is provided with an inclined straight working face 8$^b$ and a curved releasing face 8$^c$. The releasing face 8$^c$ extends from a point adjacent the pivot pin 7 to the inner end of the working face 8$^b$ to provide the pawl with a sharp biting edge 9 adapted to engage the periphery of the screw threads 3 to prevent the nut from turning off of the bolt 1. A portion of the releasing face 8$^c$ lies in contact with the peripheries of two or more of the threads 3 to prevent the biting edge from engaging the periphery of the screw threads during the turning up of the nut upon the bolt. A spring 10 seated in a socket 11 communicating with the recess 5 bears at its upper end against the body 8 of the locking element, and a stud 12 serves to hold said spring in place. The upper edge of the pawl body 8 is plane, and when a wrench is applied to the bolt, the body is moved on the pivot 7 to lie flush with the wrench engaging surface and to lift the biting edge 9 from the threads to permit the nut to be adjusted on the bolt. When the wrench is removed from the nut, the spring 10 throws the biting edge 9 into engagement with the threads 3 of the bolt and prevents the removal of the nut.

As shown in Fig. 3, two oppositely disposed locking elements are mounted in recesses 14 in one face of the nut and these locking elements operate reversely so that the nut cannot be moved in either direction excepting upon the application of a wrench. The recesses 14 are arranged in parallel relation, and extend in opposite directions. To permit both locking elements to be mounted on a single pivot pin 7, the inner ends of the recesses are arranged in overlapping relation. It will be obvious however that the pawls 8 may be disposed in opposite faces of the nut, if desired.

From the foregoing it will be obvious that a nut lock made in accordance with this invention is reliable and efficient for its purpose, will permit the ready adjustment of the nut by the application of a wrench, and will hold the nut in any adjusted position on the bolt, and is reliable and efficient for its purpose.

Various changes may be made in the details of construction without departing from the spirit and scope of the invention as defined in the claim.

What is claimed is:—

In combination, a nut provided with a pair of recesses opening out through one of its faces, said recesses extending in opposite directions and having their inner ends arranged in overlapped relation, a single pivot pin carried by the nut and passing through the overlapped inner ends of the recesses, a locking element mounted in each recess and pivoted upon said pin, and a spring located between the bottom walls of the recesses and the inner sides of said locking elements.

In testimony whereof I affix my signature in presence of two witnesses.

CHARLES V. HERVERT.

Witnesses:
W. F. RICHARDSON,
Jos. C. KRIKA.

Copies of this patent may be obtained for five cents each, by addressing the "Commissioner of Patents, Washington, D. C."